United States Patent [19]

Quinlan

[11] 4,297,484

[45] Oct. 27, 1981

[54] QUATERNIZED DERIVATIVES OF POLYMERIZED PYRIDINES AND QUINOLINES

[75] Inventor: Patrick M. Quinlan, Webster Groves, Mo.

[73] Assignee: Petrolite Corporation, St. Louis, Mo.

[21] Appl. No.: 32,044

[22] Filed: Apr. 23, 1979

[51] Int. Cl.$^3$ .................... C08G 73/06; C07D 213/04; C07D 215/04; C07D 221/06
[52] U.S. Cl. .................................. 528/423; 546/181; 546/255; 546/102; 546/101; 260/45.8 NW; 252/357; 252/358; 252/394; 424/258; 424/263; 424/329
[58] Field of Search ................ 546/181, 255; 528/423; 260/45.8 NW

[56] References Cited

U.S. PATENT DOCUMENTS 2,500,597  5/1950  Arnold et al. ............. 260/45.8 NW
2,807,910  10/1957  Erickson ............................. 546/255

Primary Examiner—Donald G. Daus
Assistant Examiner—D. B. Springer
Attorney, Agent, or Firm—Sidney B. Ring; Hyman F. Glass

[57] ABSTRACT

This invention relates to alkylated derivatives of polymerized aromatic nitrogen heterocyclic compounds as illustrated by polymerized pyridine, quinoline and derivatives thereof; and uses thereof.

These compositions are polymerized by treating said aromatic nitrogen heterocyclic compounds at elevated temperatures and pressures with catalytic amounts of alkyl halides and then alkylating the polymerized products formed.

4 Claims, No Drawings

QUATERNIZED DERIVATIVES OF POLYMERIZED PYRIDINES AND QUINOLINES

In Ser. No. 032,037 filed Apr. 23, 1979 there is described and claimed a process for the polymerization of aromatic heterocyclic nitrogen compounds including pyridine and quinoline and derivatives thereof. Said application described aromatic heterocycles such as quinolines and pyridines which when heated to >250° C. with catalytic amounts of alkyl halides undergo polymerization. When the IR spectra are evaluated, probable structures are the following.

POLYQUINOLINES $$+N=CR-CR=CR-\underset{x}{\text{[benzene ring]}}$$

$$+N=CR-CR=CR-\underset{y}{\text{[benzene ring]}}$$

where $x+y = 1-100$ but preferably 1-10.
R = alkyl, OH, halogen.

POLYPYRIDINES $$+CR=CR-CR=CR-CR=N+_x$$

where $x = 1-100$ but preferably 1-10
R = alkyl, halogen, aryl.

I have found that the resulting polyaromatic heterocycles such as polyquinolines and polypyridines, when alkylated with alkyl halides, dimethyl sulfate and other alkylating agents form iminium salts. This reaction is well known and may be illustrated by the following general equation.

$$\mathord{>}C=N- + RX \longrightarrow \mathord{>}C\overset{R}{\underset{\oplus}{=}}N\ X^{\ominus}$$

where R = alkyl, aralkyl, alkenyl, alkynl, and the like.
X = halogen, sulfate and the like.

Thus the reaction of polyquinoline with an alkyl halide may be illustrated by the following equation:

$$+N=CH-CH=CH-\underset{x}{\text{[benzene ring]}} + CH_3I \longrightarrow$$

$$+\underset{\oplus\ I^{\ominus}}{\overset{CH_3}{N}}=CH-CH=CH-\underset{y}{\text{[benzene ring]}}$$

Similarly the reaction of polypyridine with an alkyl halide may be illustrated by the following equation:

$$+N=CH-CH=CH-CH=CH\!+_x + CH_3I \longrightarrow$$

$$+\underset{\oplus\ I^{\ominus}}{\overset{CH_3}{N}}=CH-CH=CH-CH=CH\!+_x$$

The polyiminium salts of this invention are useful as corrosion inhibitors, microbiocides, water clarifiers, emulsion breakers of the oil-in-water class.

Non-limiting examples of heterocyclic aromatic compounds that can be polymerized for utilization in this invention include quinoline, 2-methyl quinoline, 4-methyl quinoline, pyridine, 2-methyl pyridine, 4-methyl pyridine, 4-phenyl pyridine, 4-ethyl pyridine, 2-hydroxypyridine, 2,4-lutidine and the like.

Alkylating agents include: methyl iodide, ethyl iodide, propyliodide, ethyl bromide, benzyl bromide, butyl bromide, dodecyl bromide, benzyl chloride, dodecyl benzyl chloride, ethyl bromoacetate, dimethyl sulfate and the like.

The alkylation may be carried out in such aprotic solvents as dimethylformamide, dimethylsulfoxide, dimethylacetamide or mixtures of the aforementioned solvents with lower alcohols such as methanol, ethanol, 2-propanol and the like.

The following examples are illustrative of the present invention.

EXAMPLE 1

Polyquinoline, 12.9 g (0.1 eqv.) with a molecular weight of *580 was dissolved with heating and stirring in 40 ml. of dimethyl formamide. The solution was cooled and 14.2 g (0.1 eqv.) of methyl iodide was added. The resulting solution was heated at 100° C. for 8 hrs. The DMF was removed by heating under reduced pressure leaving a red-brown solid that was soluble in a 50:50, by volume, mixture of water and ethanol.
*Osmometer molecular weight in CHCl$_3$.

Anal. %I calc. = 46.86, %I found = 47.21
H'n,m,r., solvent CDCl$_3$, reference T.M.S., $\tau = 6.46$ (N+ $-$CH$_3$).

The product consisted of the following structural species:

$$+\underset{CH_3}{\overset{\oplus\ I^{\ominus}}{N}}=CH-CH=CH-\underset{x}{\text{[benzene ring]}}$$

$$+\underset{CH_3}{\overset{\oplus\ I^{\ominus}}{N}}=CH-CH=CH-\underset{y}{\text{[benzene ring]}}$$

EXAMPLE 2

In a similar manner, polyquinoline (molecular weight of 580) 12.9 g (0.1 eqv.) was reacted with 17.0 g (0.1 eqv.) of propyl iodide in 50 ml. of dimethylformamide for 8 hrs. at 100° C. The product, soluble in a mixture of water and ethyl alcohol, had the following structural configuration.

$$+\underset{C_3H_7}{\overset{\oplus\ I^{\ominus}}{N}}=CH-CH=CH-\underset{x}{\text{[benzene ring]}}$$

$$+\underset{C_3H_7}{\overset{\oplus\ I^{\ominus}}{N}}=CH-CH=CH-\underset{y}{\text{[benzene ring]}}$$

EXAMPLE 3

In a similar manner, polyquinoline (molecular weight of 700) 12.9 g (0.1 eqv.) was reacted at 120° C. with 24.9 g (0.1 eqv.) of dodecyl bromide in a mixture of 40 ml. of dimethylformamide and 10 ml. of n-propanol for a period of 16 hrs. The product, soluble in a mixture of water and ethanol, had the following structural configuration.

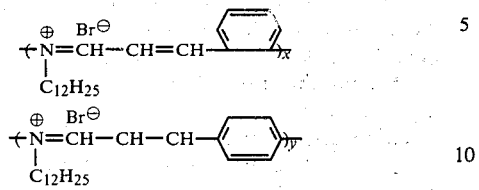

EXAMPLE 4

In a similar manner, poly(4-methyl quinoline) 14.3 g (0.1 eqv.) having a molecular weight of 900, was reacted with 14.2 g (0.1 eqv.) of methyl iodide in 50 ml. of dimethylsulfoxide for 8 hrs. at 100° C. The product had the following structural configuration.

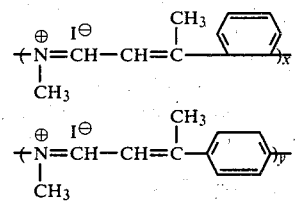

EXAMPLE 5

In a similar manner poly(2-methyl quinoline) 14.3 g (0.1 eqv.) having a molecular weight of 820, was reacted with 27.7 g (0.1 eqv.) of tetradecyl bromide at 130° C. in 50 ml. of dimethylformamide for 24 hours. The product had the following structural configuration.

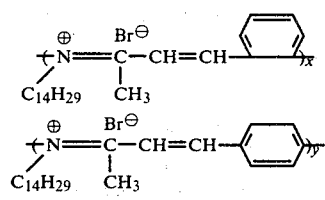

EXAMPLE 6

In a similar manner, polyquinoline (molecular weight of 580) 12.9 g (0.1 eqv.) was reacted at 120° C. with 17.1 g (0.1 eqv.) of benzyl bromide in a mixture of 30 ml. of dimethylformamide and 10 ml. of n-propanol for 16 hrs. The product had the following structural configuration.

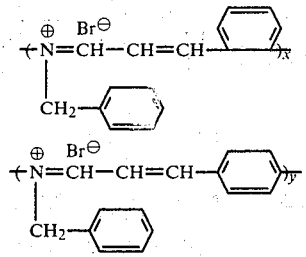

EXAMPLE 7

Polypyridine, 7.9 g (0.1 eqv.) having a molecular weight *500 was reacted with 14.2 g (0.1 eqv.) of $CH_3I$ in 40 ml. of dimethylformamide at 100° C. for 8 hrs. The product was a red-brown solid soluble in water. It had the following structure:

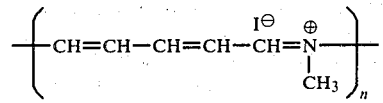

Anal. %I calcd.=57.47, %I found=58.01.

EXAMPLE 8

Polypyridine 7.9 g (0.1 eqv.) with a molecular weight of 500 was reacted with 24.9 g (0.1 eqv.) of dodecyl bromide for 16 hrs. at 100° C. in 50 ml. of dimethylformamide. The product had the following structure.

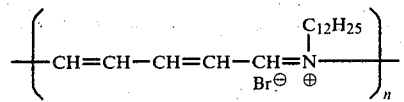

To avoid repetitive details and to further illustrate the invention, additional examples are summarized in the following table.

TABLE 1

| Example | Polypyridine | Alkylating Agent | Structure of Product |
|---|---|---|---|
| 9 | $+CH=CH-CH=CH-C=N+_n$ with $CH_3$ | $C_6H_5CH_2Cl$ | $+CH=CH-CH=CH-C=N+_n$ with $CH_3$, $CH_2C_6H_5$, $\oplus Cl^\ominus$ |
| 10 | $+CH=CH-CH=CH-CH=N+_n$ | $C_{14}H_{29}Br$ | $+CH=CH-CH=-CH=N+_n$ with $C_{14}H_{29}$, $\oplus Br^\ominus$ |
| 11 | $+CH=CH-CH=CH-CH=N+_n$ | $C_8H_{17}Br$ | $+CH=CH-CH=CH-CH=N+_n$ with $C_8H_{17}$, $\oplus Br^\ominus$ |

TABLE 1-continued

| Example | Polypyridine | Alkylating Agent | Structure of Product |
|---|---|---|---|
| 12 | $\left(\begin{array}{c}-CH=CH-C=CH-CH=N-\\ \phantom{xxx}\big/\\ CH_3\end{array}\right)_n$ | $C_{10}H_{21}Br$ | $\left(\begin{array}{c}\phantom{xxxxxxxxxxx}Br^{\ominus}\ \ \oplus\\ -CH=CH-C=CH-CH=N-\\ \phantom{xxx}\big/\phantom{xxxxxxxxxx}\big|\\ CH_3\phantom{xxxxxxxx}C_{10}H_{21}\end{array}\right)_n$ |
| 13 | $(CH=CH-CH=CH-CH=N)_{\overline{n}}$ | $C_3H_7I$ | $\left(\begin{array}{c}\phantom{xxxxxxxxx}I^{\ominus}\ \ \oplus\\ -CH=CH-CH=CH-CH=N-\\ \phantom{xxxxxxxxxxxxx}\big|\\ \phantom{xxxxxxxxxxxx}C_3H_7\end{array}\right)_n$ |
| 14 | $(CH=CH-CH=CH-CH=N)_{\overline{n}}$ | $(CH_3)_2SO_4$ | $\left(\begin{array}{c}\phantom{xxxxxxxxxx}\oplus\ CH_3SO_4^{\ominus}\\ -CH=CH-CH=CH-CH=N-\\ \phantom{xxxxxxxxxxxxx}\big/\\ \phantom{xxxxxxxxxxxx}CH_3\end{array}\right)_n$ |

USES

This invention also relates to the inhibition of corrosion, particularly the corrosion of metals in contact with the acid solutions.

The present invention is especially useful in the acidizing or treating of earth formations and wells traversed by a bore hole. It may also be used in metal cleaning and pickling baths which generally comprise aqueous solutions of inorganic acids such as sulfuric acid, hydrochloric acid, phosphoric acid and are useful in the cleaning and treatment of iron, zinc, ferrous alloys, and the like.

If no corrosion inhibitor is present when the aqueous acidic solution comes in contact with the metal, excessive metal loss and consumption or loss of acid, and other adverse results will be experienced. There has been a continuing search for corrosion inhibitors which can be used effectively in small concentrations, and which are economical to produce. The need is also for corrosion inhibitors which are effective at high temperatures, e.g., 200° F. and above, such as are found in operations involving acidic solutions, particularly oil-well acidizing where higher and higher temperatures are found as the well extends further into the earth.

While the compounds of this invention are of themselves particularly good acid corrosion inhibitors, optionally they may be blended with acetylenic alcohols, dispersing and solubilizing agents such as ethoxylated phenols, alcohols, and fatty acids. They may also be blended with such known acid inhibitors as the quinoline or alkyl pyridine quaternary compounds or synergists such as terpene alcohols, formamide, formic acid, alkyl amine, alkylene polyamines, heterocyclic amines, and the like.

Quaternary ammonium compounds may be illustrated by C-alkyl pyridine-N-methyl chloride quaternary, C-alkyl pyridine-N-benzyl chloride quaternary, quinoline-N-benzyl chloride quaternary, isoquinoline-N-benzyl chloride quaternary, thioalkyl pyridine quaternaries, thioquinoline quaternaries, benzoquinoline quaternaries, thiobenzoquinoline quaternaries, imidazole quaternaries, pyrimidine quaternaries, carbazole quaternaries, the corresponding ammonium compounds, pyridines and quinolines may also be used alone or in combination with the quaternary compounds. Thus a pyridine plus quinoline quaternary, a quinoline plus quinoline quaternary, or quinoline or amine alone or in combination may be used.

The formic acid compound may be selected from the esters and amides of formic acid. The formic acid compound may be from the group consisting of formate esters of the structure:

HCOOR where R is a monoaryl group, an alkyl group having 1 to 6 carbon atoms, cyclo-alkyl residues having 5 to 6 carbon atoms, alkenyl and alkynl groups having 2 to 6 carbon atoms which may contain functional groupings selected from —C—OH, —OH, =C=O, —COOH, —SH, and NH$_2$. Examples of the formic acid compound are: methyl formate, ethylformate, benzyl formate, other alkyl and aryl formates, and the like. Other examples include formamide, dimethyl formamide, formanilide, and the like. Mixtures of the esters and mixtures of the amides may be used.

USE IN ACIDIZING EARTH FORMATIONS

The compositions of this invention can also be used as corrosion inhibitors in acidizing media employed in the treatment of deep wells to reverse the production of petroleum or gas therefrom and more particularly to an improved method of acidizing a calcareous or magnesium oil-bearing formation.

It is well known that production of petroleum or gas from a limestone, dolomite, or other calcareous-magnesian formation can be stimulated by introducing an acid into the producing well and forcing it into the oil or gas bearing formation. The treating acid, commonly a mineral acid such as HCl, is capable of forming water soluble salts upon contact with the formation and is effective to increase the permeability thereof and augment the flow of petroleum to the producing well.

Corrosion Test Procedure

In these tests the acid solutions were mixed by diluting concentrated hydrochloric acid with water to the desired concentrations.

Corrosion coupons of 1020 steel (AISI) were pickled in an uninhibited 10% HCl solution for 10 minutes, neutralized in a 10% solution of NaHCO$_3$, dipped in acetone to remove water and allowed to dry. They were then weighed to the nearest milligram and stored in a desicator.

In most of the tests, a 25 cc/in$^2$ acid volume to coupon surface area ratio was used. After the desired amount of acid was poured into glass bottles, the inhibitor was added. The inhibited acid solution was then placed in a water bath which had been set at a predetermined temperature and allowed to preheat for 20 minutes. After which time, the coupons were placed in the preheated inhibited acid solutions. The coupons where left in the acid solutions for the specified test time, then removed, neutralized, recleaned, rinsed, dipped in acetone, allowed to dry, then reweighed.

The loss in weight in grams was multiplied times a calculated factor to convert the loss in weight to lbs./ft²/24 hrs. The factor was calculated as follows:

$$\frac{\frac{144 \text{ in}^2}{\text{ft}^2}}{\frac{454 \text{ g}}{\text{lb}} \times \text{Surface Area of Coupon (in}^2) \times \frac{1 \text{ day}}{24 \text{ hrs.}}} = \text{Factor}$$

The inhibitor compositions were employed to inhibit corrosion in 15% hydrochloric acid. The tests were run at 150° F. for 4 hours. 0.2%, by volume, inhibitor was employed. The results of the test are tabulated in the table below.

TABLE 2

| Example no. | Corrosion rate (lbs./ft.²/day) |
| --- | --- |
| Blank | 3.324 |
| 1 | 0.087 |
| 2 | 0.112 |
| 3 | 0.052 |
| 5 | 0.051 |
| 6 | 0.035 |
| 7 | 0.081 |
| 8 | 0.043 |
| 9 | 0.045 |

WATER CLARIFICATION

This phase of the present invention relates to a method for the clarification of water containing suspended matter.

Accordingly clarification of water containing suspended particles of matter is effected by adding to such water compounds of this invention.

Water containing suspended particles which may be treated by the present invention may have its origin either in natural or artificial sources, including industrial and sanitary sources. Waters containing suspended particles of natural origin are usually surface waters, wherein the particles are suspended soil particles (silt), although sub-surface waters may also be treated according to the present invention. Water having its origin in industrial process (including sanitary water) operations may contain many different varieties of suspended particles. These particles are generally the result of the particular industrial or sanitary operation concerned. Prior to discharging such industrial waste waters into natural water courses it generally is desired that the suspended matter be removed.

The present process may likewise be applied to water contained in stock or fish ponds, lakes or other natural or artificial bodies of water containing suspended solids. It may be applied to industrial water supplied either in preparation therefor, during or after use and prior to disposal. It may be applied to sanitary water supplies either for the elimination of suspended solids prior to use for such purposes, or it may be applied to such waters which have become contaminated with impurities from any source.

Most naturally occurring waters contain an amount of simple electrolytes (sodium, potassium, ammonium, calcium, aluminum salts, etc.) in excess of that necessary for the initial aggregation of the ultimate silt particles. This is likewise true of particles of suspended material in industrial or sanitary waters. The ultimate particles of silt or other materials are therefore naturally somewhat aggregated by reason of the presence of such electrolytes. However, the forces binding such ultimate particles together are not great and moreover are not such as to generally effect either rapid settling rates of the flocculated material or strong enough to prevent deflocculation.

The compounds of this invention cause rapid flocculation and also reinforce the formed aggregates of particles causing a general tightening or bonding together of the initial particles and an increased rate of coagulation and settling, thus forming a less turbid supernatant liquid.

The addition of the compounds of this invention to the water suspension should be made in such a fashion that the resulting flocculation and aggregation of the particles takes place uniformly throughout the body of water. In order to obtain a uniform addition of the compositions of the invention to the water-borne suspension it is generally desirable to prepare a relatively dilute stock solution of the compositions and then to add such solution to the body of water in the proportions indicated. Clarification may take place either in the natural body of water or it may be caused to take place in hydraulic thickeners of known design.

The amount of the compositions to be employed will vary depending upon the amount and the degree of subdivision of the solids to be agglomerated or flocculated, the chemical nature of such solid and the particular inventive compositions employed. In general, we employ at least a sufficient amount of the compositions to promote flocculation. In general, we employ 0.005–10,000 ppm or more such as about 0.5–1,000 ppm, for example, about 1–500 ppm, but preferably about 2–5 ppm. Since the economics of these processes are important, no more than the minimum amount required for efficient removal is generally employed. It is desired, of course, to employ sufficient compositions so flocculation will take place without causing the formation of stable dispersions.

The precipitating action of the compositions can be employed in the application of loading or filling materials to textiles or paper.

In the processing of fine mineral particles in aqueous suspension the flocculating agents will be especially useful. In the processing of ores to separate valuable mineral constituents from undesirable matrix constituents, it is frequent practice to grind the ore into a finely divided state to facilitate separation steps such as selective flotation and the like. In many ore dressing procedures, the finely divided ore is suspended in water to form a pulp or slime. After processing, it is usually desirable to dewater the pulps or slimes either by sedimentation or filtering. In such operations, certain ores are particularly troublesome in that the finely divided ore, when suspended in water, forms a stable slime which settles very slowly, if at all. Such slimes are unsuitable for concentration or dewatering by sedimentation and are difficult to dewater by filtration because of the tendency to clog the pores of the filter, thus leading the excessively time-consuming and inefficient operation of the filters. In some cases, for example, in certain phosphate mining operations, the formation of very stable suspensions of finely divided mineral results not only in the loss of considerable valuable mineral as waste but also requires large expenditures for the maintenance of holding ponds for the waste. Similar problems are involved in processing fold, copper, nickel, lead, zinc, iron, such as taconite ores, uranium and other ores, and the inventive flocculating agents will be useful in these operations.

Some specific additional applications for the compositions of this invention, not intended to be limiting but merely illustrative are listed below. The compositions can be used for the clarification of beers or wines during manufacture. Another use is in processing effluents in pharmaceutical operations for the recovery of valuable products or removal of undesirable by-products. A particularly important use for these flocculating agents is in the clarification of both beet sugar and cane sugar juices in their processing. Still another use is for flocculation and recovery of pigments from aqueous suspensions thereof. The compositions will be particularly useful in sewage treatment operations as a flocculating agent. A further use is to promote by flocculation the removal of coal from aqueous suspensions thereof. In other words, the flocculating agents of the invention are generally useful for processing aqueous effluents of all types to facilitate the removal of suspended solids.

A water soluble or water dispersible compound, to the extent of effective concentration, is employed.

These compositions can also be employed in the process of flocculating white water and/or recycling of the precipitate solids in the paper making process.

Although the manner of practicing the present invention is clear from the foregoing description, the following non-limiting specific examples are included for purposes of illustration.

Naturally occurring water from many sources, and in some instances, brine and brackish waters are used in the recovery of petroleum by secondary water-flooding operations. Clarification of the water is necessary in many instances prior to water flooding because the suspended impurities tend to plug the underground formations into which waters are pumped.

EXAMPLES

A suspension of FeS in brine was subjected to the action of the water-soluble compounds prepared herein.

In these tests, the FeS concentration is 25 parts per million and 1 and 5 percent brine solution were used. Metered quantities (500 ml.) of the homogenous suspension were placed into 1,000 ml. beakers and stirred at 100 rpm. The compound to be tested was injected into the suspension to give final active concentrations varying between 2 through 4 parts per million. Stirring was achieved by use of a Phipp and Bird "floc" multi-stirrer. After 1 minute the stirring rate was reduced to 20 to 30 rpm and maintained thus for 10 minutes. At this time the stirring was stopped. The evaluation of the compound started at the moment of flocculation and continued with respect to the "floc" size and rate of precipitation. The final evaluation was achieved by visual examination of the color of the resultant aqueous phase.

For example, example numbers 1, 2, 4, 7, 13, and 14, at 2 p.p.m., were particularly effective in regard to "floc" size, rate of precipitation, and final water clarity.

USE AS A MICROBIOCIDE

(I) In water treatment

This phase of the present invention relates to the treatment of water. More particularly, it is directed to providing improved means for controlling microbiological organisms including bacteria, fungi, algae, protozoa, and the like, present in water.

It is well known that ordinary water contains various bacteria, fungi, algae, protozoa and other microbiological organisms which, if uncontrolled, multiply under certain conditions so as to present many serious problems. For example, in swimming pools the growth of these microbiological organisms is very undesirable from a sanitary standpoint as well as for general appearances and maintenance. In industrial water systems such as cooling towers, condenser boxes, spray condensers, water tanks, basins, gravel water filters, and the like, microbiological organisms may interfere greatly with proper functioning of equipment and result in poor heat transfer, clogging of systems and rotting of wooden equipment, as well as many other costly and deleterious effects.

In other industrial applications where water is used in processes, as for example, as a carrying medium, etc., microbiological organisms may also constitute a problem in maintenance and operation. Illustrative of such industrial applications are the pulp and paper manufacturing processes, oil well flooding operations and the like.

The products of this invention are suitable as biocides for industrial, agricultural and horticultural, military, hygienic and recreationsl water supplies. They provide an inexpensive, easily prepared group of products which can be used, in minimal amounts, in water supplies, in cooling towers, air-conditioning systems, on the farm and ranch, in the factory, in civilian and military hospitals and dispensaries, in camps, for swimming pools, baths and aquaria, waterworks, wells, reservoirs, by fire-fighting agencies, on maritime and naval vessels, in boilers, steam-generators and locomotives, in pulp and paper mills, for irrigation and drainage, for sewage and waste disposal, in the textile industry, in the chemical industries, in the tanning industry, et cetera, and which will render said water supplies bactericidal, fungicidal and algicidal. They further provide a simple process whereby water supplies, for whatever purposes intended, are rendered bacteriostatic, fungistatic and algistatic, i.e., said water supplies treated by the process of this invention will resist and inhibit the further growth or proliferation of bacteria, fungi, algae and all forms of microbial life therein.

(II) Water flooding in secondary recovery of oil

This phase of the present invention relates to secondary recovery of oil by water flooding operations and is more particularly concerned with an improved process for treating flood water and oil recovery therewith. More particularly this invention relates to a process of inhibiting bacterial growth in the recovery of oil from oil-bearing strata by means of water flooding taking place in the presence of sulfate-reducing bacteria.

Water flooding is widely used in the petroleum industry to effect secondary recovery of oil. By employing this process the yield of oil from a given field may be increased beyond the 20–30 percent of the oil in a producing formation that is usually recovered in the primary process. In flooding operation, water is forced under pressure through injection wells into or under oil-bearing formations to displace the oil therefrom to adjacent producing wells. The oil-water mixture is usually pumped from the producing wells into a receiving tank where the water, separated from the oil, is siphoned off, and the oil then transferred to storage tanks. It is desirable in carrying out this process to maintain a high rate of water injection with a minimum expenditure of energy. Any impediment to the free entry of water into oil bearing formations seriously reduces the efficiency of the recovery operation.

The term "flood water" as herein employed is any water injected into oil bearing formations for the secondary recovery of oil. In conventional operations, the water employed varies from relatively pure spring water to brine and is inclusive of water reclaimed from secondary recovery operations and processed for recycling. The problems arising from the water employed depend in part on the water used. However, particularly troublesome and common to all types of water are problems directly or indirectly concerned with the presence of microorganisms, such as bacteria, fungi and algae. Microorganisms may impede the free entry of water into oil-bearing formations by producing ions susceptible of forming precipitates, forming slime and/or existing in sufficiently high numbers to constitute an appreciable mass, thereby plugging the pores of the oil-bearing formation. Free-plugging increases the pressure necessary to drive a given volume of water into an oil-bearing formation and oftentimes causes the flooding water to by-pass the formation to be flooded. In addition, microorganisms may bring about corrosion by acting on the metal structures of the wells involved, producing corrosive substances such as hydrogen sulfide, or producing conditions favorable to destructive corrosion such as decreasing the pH or producing oxygen. The products formed as the result of corrosive action may also be pore-plugging precipitates. Usually, the difficulties encountered are a combination of effects resulting from the activity of different microorganisms.

(III) Hydrocarbon treatment

This phase of the present invention relates to the use of these compounds as biocides in hydrocarbon systems.

In addition to being used as biocides in aqueous systems, the compounds of this invention can also be employed as biocides in hydrocarbon systems, particularly when petroleum products are stored. It is believed that bacteria and other organisms, which are introduced into hydrocarbon systems by water, feed readily on hydrocarbons resulting in a loss in product; that microorganisms cause the formation of gums, H₂S, peroxides, acids and slimes at the interface between water and oil; that bacterial action is often more pronounced with rolling motion than under static conditions, etc. Loss of product, corrosion of the storage tank, clogging of filters and metering instruments, and fuel deterioration are among the harmful effects of bacteria growth in fuels. The activity of microorganism growth is often increased by the presence of rust. Not only do these microorganisms often encourage rust but rust encourages microorganism growth. Since microorganism growth appears to be considerably higher with kerosene than with gasoline, plugged filters experienced with jet fuels which contain large amounts of kerosene is a serious problem.

The compositions of this invention can be employed in hydrocarbon systems.

MICROBIOCIDAL TESTING

The screening procedure was as follows: a one percent by weight solution of the test compound in water was prepared. The solution was aseptically added to a sterile broth that would support the growth of the test organism, *Desulfovibro desulfuricans,* to provide a concentration of 25, 50 and 100 parts by weight of test compound per million parts by weight of broth. A general growth medium, such as prescribed by the American Petroleum Institute was used. The broth containing the test compound then was dispersed in 5 cc. amounts into sterile disposable tubes and the tubes were inoculated with the growing test organism and incubated at 35° C. for 24 hours. The absence or presence of growth of the microorganisms was determined by visual inspection by an experienced observer.

Following is a summary of the results of the testing of examples of this invention.

| Compound example number | Concentration of test compound, p.p.m. | Results |
|---|---|---|
| 3 | 50 | Gave control.[1] |
| 5 | 25 | " |
| 8 | 50 | " |
| 10 | 25 | " |

[1]By control is meant that the test compound was biostatic or biocidal-i.e., no growth of the testorganism occurred under the test conditions.

BREAKING EMULSIONS OF THE OIL-IN-WATER CLASS

This phase of the present invention relates to a process for resolving or separating emulsions of the oil-in-water class, by subjecting the emulsion to the action of the compositions of this invention.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or bring are representative oil-in-water emulsions. Other oil-in-water emulsions include: steam cylinder emulsions, in which traces of lubricating oil are found dispersed in condensed steam from steam engines and steam pumps; wax-hexane-water emulsions, encountered in de-waxing operations in oil refining; butadiene tar-in-water emulsions, in the manufacture of butadiene tar-in-water emulsions, in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions, in synthetic rubber plants; synthetic latex-in-water emulsions, in plants producing copolymer butadiene-styrene or GR-S synthetic rubber; oil-in-water emulsions occurring in the cooling water systems of gasoline absorption plants; pipe press emulsions from steam-actuated presses in clay pipe manufacture; emulsions or petroleum residues-in-diethylene glycol, in the dehydration of natural gas.

In other industries and arts, emulsions of oily materials in water or other non-oily media are encountered for example, in synthetic resin emulsion paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from the flushing with water of manufacturing areas or equipment, the oil content may be only a few parts per million. Resin emulsion paints, as produced contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of these emulsions of the oil-in-water class which contain a minor proportion of dispersed phase, ranging from 20% down to a few parts per million. Emulsions containing more than about 20% of dispersed phase are commonly of such stability as to be less responsive to the presently disclosed reagents, possibly because of the appreciable content of emulsifying agent present in such systems, whether intentionally incorporated for the purpose of stabilizing them, or not.

Although the present invention relates to emulsions containing as much as 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists, and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersions; yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrence.

Some emulsions are by-products of manufacturing procedures, in which the composition of the emulsion and its ingredients is known. In many instances, however, the emulsions to be resolved are either naturally-occurring or accidentally or unintentionally produced; or in any event they do not result from a deliberate or premeditated emulsification procedure. In numerous instances, the emulsifying agent is unknown; and as a matter of fact an emulsifying agent in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to 20% are herein included, as stated above.

The process which constitutes the present invention comprises subjecting an emulsion of the oil-in-water class to the action of a reagent or demulsifier of the kind herein described, thereby causing the oil particles in the emulsion to coalesce sufficiently to rise to the surface of the non-oily layer (or settle to the bottom, if the oil density is greater), when the mixture is allowed to stand in the quiescent state after treatment with the reagent or demulsifier.

In operating the present process to resolve an oil-in-water emulsion, the reagent is introduced at any convenient point in the system, and it is mixed with the emulsion in any desired manner, such as by being pumped or circulated through the system or by mechanical agitation such as paddles, or by gas agitation. After mixing, the mixture of emulsion and reagent is allowed to stand quiescent until the constituent phases of the emulsion separate. Settling times and optimum mixing times will, of course, vary with the nature of the emulsions and the apparatus available. The operation, in its broadest concept, is simply the introduction of the reagent into the emulsion, the mixing of the two to establish contact and promote coalescence, and, usually, the subsequent quiescent settling of the agitated mixture, to produce the aqueous and non-aqueous emulsion phases as stratified layers.

Agitation may be achieved in various ways. The piping system through which the emulsion is passed during processing may itself supply sufficient turbulence to achieve adequate mixing of reagent and emulsion. Baffled pipe may be inserted in the flow sheet to provide agitation. Other devices such as perforated-chamber mixers, excelsior- or mineral- or gravel- or steel-shaving-packed tanks, beds or stones or gravel or minerals in open ducts or trenches may be employed beneficially to provide mixing. The introduction of a gas, such as natural gas or air, into a tank or pipe in which or through which the mixture of reagent and emulsion is standing or passing is frequently found suitable to provide desired agitation.

It has been found that the factors, reagent feed rate, agitation and settling time are somewhat inter-related. For example, with sufficient agitation of proper intensity the settling time required can be materially shortened. On the other hand, if agitation is relatively non-procurable but extended settling time is, the process may be equally productive of satisfactory results. The reagent feed rate has an optimum range, which is sufficiently wide, however, to meet the tolerances required for the variances encountered daily in commercial operations.

Application of a suitable gas in a procedure approximating that of the froth flotation cell employed in ore beneficiation, after the present reagent has been added to the emulsion to be resolved, frequently has a favorable influence of totally unexpected magnitude. By incorporating the step of subjecting the chemicalized emulsion to the action of air in a sub-aeration type flotation cell, a clear aqueous layer is sometimes obtained in a matter of seconds, without added quiescent settling, and with approximately as much reagent as used in a companion test in which no agitation was used. Such companion test separated a clear aqueous layer only after standing quiescent for hours. Natural gas was found to be as good a gaseous medium as was air in this operation.

It should be distinctly understood that such aeration technique, while an important adjunct to the use of the present reagent, in some cases, is not an equivalent procedure. This may be proved by subjecting an unchemicalized emulsion to aeration for a period of minutes without detectable favorable effect. Addition of the reagent to such aerated emulsion will produce resolution, promptly.

The details of the mechanical structures required to produce aeration suitable for the present purpose need not be given here. It is sufficient to state that any means capable of producing small gas bubbles within the body of the emulsion is acceptable for use.

The order in which the reagent and the aeration step are applied is relatively immaterial. Sometimes it is more convenient to chemicalize the emulsion and subsequently to apply the aeration technique. In others, it may be more advantageous to produce a strongly frothing emulsion and then introduce the reagent into such aerated emulsion.

As stated previously, any desired gas can be substituted for air. Other commonly suitable gases include natural, gas nitrogen, carbon dioxide, oxygen, etc., the gas being used essentially for its levitation effect. If any gas has some deleterious effect on any component of the emulsion, it will obviously be desirable to use instead some other gas which is inert under the conditions of use.

Although heat is ordinarily of little importance in resolving oil-in-water class emulsions with my reagent, there are some instances where heat is a useful adjunct. This is especially true where the viscosity of the continuous phase of the emulsion is appreciably higher than that of water.

In some instances, importantly improved results are obtained by adjusting the pH of the emulsion to be treated, to an experimentally determined optimum value.

The reagent feed rate also has an optimum range, which is sufficiently wide, however, to meet the tolerances required for the variances encountered daily in commercial operations. A large excess of reagent can produce distinctly unfavorable results.

The reagents may be employed alone, or they may in some instances be employed to advantage admixed with other compatible oil-in-water demulsifiers.

The process is commonly practiced simply by introducing small proportions of the reagent into an oil-in-water class emulsion, agitating to secure distribution of the reagent and incipient coalescence, and letting the mixture stand until the oil phase separates. The proportion of reagent required will vary with the character of the emulsion to be resolved. Ordinarily, proportions of reagent required are from about 1 ppm to about 500 ppm the volume of emulsion treated, but more or less may be required in specific instances. Preferably from about 10 ppm to 100 ppm is employed.

A preferred method of practicing the process to resolve a petroleum oil-in-water emulsion is as follows: Flow the oil well fluids, consisting of free oil, oil-in-water emulsion, and natural gas, through a conventional gas separator, then to a conventional steel oilfield tank, of, for example, 5,000-bbl. capacity. In this tank the oil-in-water emulsion falls to the bottom, is withdrawn, and is so separated from the free oil. The oil-in-water emulsion, so withdrawn, is subjected to the action of the reagent in the desired small proportion, injection of reagent into the stream of oil-in-water emulsion being accomplished by means of a conventional proportioning pump or chemical feeder. The proportion employed in any instance is determined by trial-and-error. The mixture of emulsion and reagent then flows to a pond or sump wherein it remains quiescent and the previously emulsified oil separates, rises to the surface and is removed. The separated water, containing relatively little to substantially none of the previously emulsified oil, is thereafter discarded.

FIELD EXAMPLES

The compositions of this invention were very effective in the resolution of oil-in-water emulsions.

A. In a California oil lease compounds of Examples 1 and 7 converted o/w petroleum emulsions to clear water in concentrations of 10 ppm.

B. In a Wyoming oil field, the compounds of Example 2 converted an o/w petroleum emulsion to clear water at 25 ppm.

I claim:

1. A quaternized derivative of polymerized pyridine or quinoline compounds, which compounds prior to polymerization are selected from the group consisting of pyridine, 2-methyl pyridine, 4-methyl pyridine, 4-phenyl pyridine, 4-ethyl pyridine, 2-hydroxypyridine, 2,4-lutidine, quinoline, 2-methyl quinoline and 4-methyl quinoline, the nitrogen atoms of which are quaternized by treating said polymerized compounds with a quaternizing agent selected from the group consisting of methyl iodide, ethyl iodide, propyl iodide, ethyl bromide, benzyl bromide, butyl bromide, dodecyl bromide, benzyl chloride, dodecyl benzyl chloride, ethyl bromoacetate, dimethyl sulfate, tetradecyl bromide and octyl bromide at a temperature of at least about 100° C.

2. The quaternized derivative of claim 1 where the quaternizing agent is selected from the group consisting of methyl iodide, ethyl iodide, propyl iodide, ethyl bromide, butyl bromide, dodecyl bromide, and dimethyl sulfate.

3. The quaternized derivative of claim 1 where the compound prior to polymerization is quinoline, the quaternizing agent is methyl iodide and where the quaternization reaction takes place at a temperature of about 100° C.

4. A benzylated derivative of polymerized pyridine or quinoline compounds, which compounds prior to polymerization are selected from the group consisting of pyridine, 2-methyl pyridine, 4-methyl pyridine, 4-phenyl pyridine, 4-ethyl pyridine, 2-hydroxypyridine, 2,4-lutidine, quinoline, 2-methyl quinoline and 4-methyl quinoline, the nitrogen atoms of which are benzylated by treating said polymerized compounds with benzyl chloride or benzyl bromide at a temperature of at least about 100° C.

* * * * *